Patented Apr. 30, 1929.

1,711,144

UNITED STATES PATENT OFFICE.

IVAN GUBELMANN, HENRY J. WEILAND, AND OTTO STALLMANN, OF SOUTH MILWAUKEE, WISCONSIN, ASSIGNORS TO THE NEWPORT COMPANY, A CORPORATION OF DELAWARE.

2′, 4′-DICHLORO-ORTHO-BENZOYL-BENZOIC ACID AND PROCESS OF MAKING THE SAME.

Application filed March 26, 1927. Serial No. 178,807.

This invention relates to 2′, 4′-dichloro-ortho-benzoyl-benzoic acid and to a process of making the same.

It is an object of this invention to provide a simple economical method for rendering technically available a valuable starting material for dyestuff intermediates.

Other and further important objects of this invention will become more apparent from the following description and appended claims.

We have now found that meta-dichlorobenzene can be condensed with phthalic anhydride in the presence of a suitable condensing agent, such as anhydrous aluminum chloride and anhydrous ferric chloride, to give 2′, 4′-dichloro-ortho-benzoyl-benzoic acid. We prefer to use anhydrous aluminum chloride for the reason that with that substance as the condensing agent, yields not far from the theoretical are obtained. The smoothness of this reaction is the more surprising in view of the fact that in the condensation of para-dichlorobenzene with phthalic anhydride, a yield of only 27.2% of theory was obtained. (See journal of American Chemical Society, 1926, p. 3198).

The reaction between phthalic anhydride and meta-dichlorobenzene is most probably best expressed by the following equation:

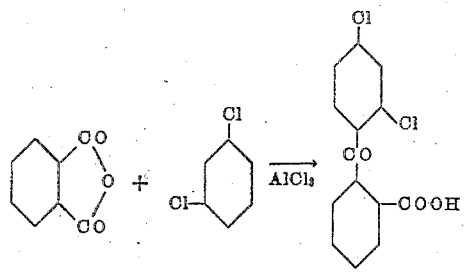

It appears obvious to us that the CO group enters into para position to one chlorine atom in the benzene ring and into ortho position to the other chlorine atom and we attribute the obtaining of excellent yields to the fact that the CO group is not forced into meta position to a chlorine atom.

2′, 4′-dichloro-ortho-benzoyl-benzoic acid is a white crystalline solid, slightly soluble in hot water and practically insoluble in cold water. It is soluble in alcohol, glacial acetic acid, and chloroform, and in dilute caustic soda, sodium carbonate solution and ammonia.

2′, 4′-dichloro-ortho-benzoyl-benzoic acid can be recrystallized from hot water in the form of white shining crystals. After repeated crystallizations the melting point could not be raised about 100–101° C.

Without limiting our invention to any particular procedure, the following example illustrates our preferred method of preparation.

Example.—315 parts of dry meta-dichlobenzene and 74 parts of phthalic anhydride are heated until all is in solution. To this solution is added at 40–50° C., 157 parts of anhydrous aluminum chloride over a period of 30 minutes. This mixture is then heated to 100–105° C. and held at this temperature until the evolution of hydrochloric acid gas is completed. The dichloro-ortho-benzoyl-benzoic acid is isolated in a manner similar to that used for other ortho-benzoyl-benzoic acid compounds. The product has a melting point of 100–101° C., and the yield is not far from that theoretically expected.

We are aware that many changes may be made, and numerous details of the process may be varied through a wide range without departing from the principles of this invention, and we therefore do not purpose limiting the patent granted hereon, otherwise than necessitated by the prior art.

We claim as our invention:

1. A process for preparing 2′, 4′-dichloro-ortho-benzoyl-benzoic acid, which comprises condensing meta-dichloro-benzene and phthalic anhydride.

2. A process for preparing 2′, 4′-dichloro-ortha-benzoyl-benzoic acid which comprises treating a mixture of metal-dichloro-benzene and phthalic anhydride with anhydrous aluminum chloride as condensing agent.

3. As a new article of manufacture, 2', 4'-dichloro-ortho-benzoyl-benzoic acid having the following chemical formula:

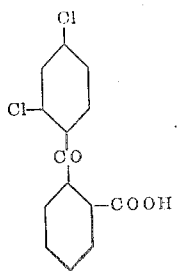

4. The process of preparing 2', 4'-dichloro-ortho-benzoyl-benzoic acid, which comprises condensing meta di-chloro benzene and phthalic anhydride in the presence of anhydrous aluminum chloride as condensing agent by heating the reaction mass to between 100° and 105° C., and holding within that temperature range until evolution of hydrochloric acid gas is completed.

In testimony whereof we have hereunto subscribed our names.

IVAN GUBELMANN.
HENRY J. WEILAND.
OTTO STALLMANN.